United States Patent [19]
Koerner et al.

[11] Patent Number: 5,675,663
[45] Date of Patent: Oct. 7, 1997

[54] ARTIFICIAL VISUAL SYSTEM AND METHOD FOR IMAGE RECOGNITION

[75] Inventors: Edgar Koerner; Hiroshi Tsujino; Tomohiko Masutani, all of Wako, Japan

[73] Assignee: Honda Giken Kogyo Kabushiki Kaisha, Tokyo, Japan

[21] Appl. No.: 619,990

[22] Filed: Mar. 21, 1996

[30] Foreign Application Priority Data

Mar. 22, 1995 [JP] Japan .................................... 7-088820

[51] Int. Cl.⁶ ................. G06K 9/00; G06K 9/62
[52] U.S. Cl. .................... 382/181; 382/118; 382/216
[58] Field of Search .................................... 382/118, 203, 382/216, 181, 224, 226, 205, 298, 299

[56] References Cited

U.S. PATENT DOCUMENTS

| | | | |
|---|---|---|---|
| 5,164,992 | 11/1992 | Turk | 382/2 |
| 5,331,544 | 7/1994 | Lu | 382/57 |
| 5,337,372 | 8/1994 | LeCun | 382/205 |
| 5,432,864 | 7/1995 | Lu | 382/118 |
| 5,497,430 | 3/1996 | Sadovnik | 382/118 |

OTHER PUBLICATIONS

M Kirby, "Application of the Karhonen–Loeve Procedure for The Characterization of Human Faces", IEEE Jan. 90.
M Turk, "Face Recognition Using Eijenfaces", IEEE 91.
Matthew Turk, Alex Pentland, "Eigenfaces For Recognition", Journal of Cognitive Neuroscience, vol. 3, No. 1, 1991 Massachusetts Institute of Technology (Vision and Modeling Group, The Media Laboratory).
Bruno A. Olshausen, Charles H. Anderson, David C. Van Essen, "A Neurobiological Model of Visual Attention and Invariant Pattern Recognition Based on Dynamic Routing of Information", The Journal of Neuroscience, Nov. 1993, 13(11).
Article entitled "A Multi–Resolution Neural Network Classifier for Machine Vision"; M.R. Evans et al., IEEE (publication date 18 Nov. 1991).

Article entitled "Mechanisms of Human Facial Recognition"; Robert J. Baron, Academic Press Inc. 1981.

*Primary Examiner*—William Cumming
*Assistant Examiner*—Brian Johnson
*Attorney, Agent, or Firm*—Lyon & Lyon LLP

[57] ABSTRACT

An artificial visual apparatus and method for image recognition having a simple adaptive scaling mechanism enables the definition of scale invariant visual icons in a processing area corresponding to the anterior inferotemporal cortex (AIT) in a one-step, value-based decision making process. Icon related activity states resulting from sensory filtering to a fourth stage KL filter corresponding to the V4 area are recognized independent of the scale and position of the item to be recognized within the maximum visual field. The AIT processing area controls the window of attention in the V4 area and confines further processing onto this selected spotlight. The invention presents a biologically plausible method for scale invariant mapping from the V4 stage filter to the AIT processor. Filtering based on principal component analysis (PCA), or Karhunen-Loeve (KL) filtering, yields image data of the item of interest in the V4 stage filter, such data then being supplied to the AIT processor by a scale-invariant mapping process which controls the number of inputs to the KL filters to achieve constant resolution independent of the scale of the item of interest in the maximum visual field. Thus, the problem of scale-invariant mapping is reduced to a simple adaptive thresholding by feedforward inhibition at the AIT processor.

20 Claims, 5 Drawing Sheets

KL Filter Output From Respective Z Components

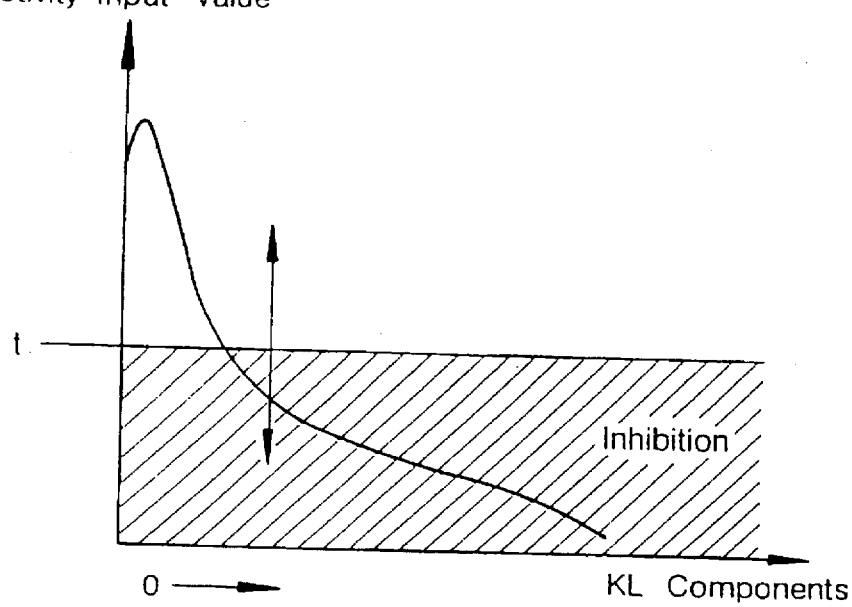
FIG. 5
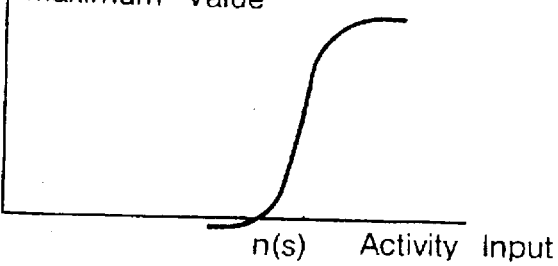
FIG. 6
FIG. 7

ARTIFICIAL VISUAL SYSTEM AND METHOD FOR IMAGE RECOGNITION

BACKGROUND OF THE INVENTION

The present invention relates to artificial intelligence systems, and more specifically to a computer processing architecture and method modeled on the visual pathways of the human brain, to enable pattern recognition, and self-learning, of complex visual data.

Numerous proposals have developed over the years for enabling machines to recognize visual patterns in a manner analogous to the functioning of the human brain. Of particular importance in this area are so-called neural networks, which consist of a plurality of processing elements, called neural units, arranged in layers, wherein interconnections are made between successive layers. A typical network has an input layer, an output layer, and one or more intermediate or hidden layers, with each unit functioning in some ways analogous to a biological neuron: a unit is capable of generating an output signal which is determined by the weighted sum of input signals it receives and a threshold specific to that unit.

By setting the weight and threshold factors properly, a pattern at the input layer successively propagates between the intermediate layers, to result in a simpler output pattern. The network can be self-taught by feeding a succession of input patterns, and the network learns by measuring the difference between the expected output pattern and the pattern that it just produced. The internal weights and thresholds are modified by a learning algorithm to provide an output pattern which approximates the expected output pattern. Thus, a neural network has the ability of process information in the presence of noisy or incomplete data and yet still generalize to the correct solution.

The difficulty with known neural networks, however, is that in order to solve a given pattern recognition problem, networks rely on complicated back-propagation learning algorithms. In practice, this has meant that only the simplest of patterns can be feasibly recognized by a conventional neural network. Such networks, however, have not proven capable of easily recognizing a complex pattern of data, such as needed to recognize a human face, for example, or other complex visual input.

Computer systems have been developed which are capable of recognizing more complex visual input, such as a subject's head, and then recognizing the subject by comparing characteristics of the human face with those of known (stored) characteristics. Such systems are more robust than conventional neural networks, in that they can isolate a face, for example, out of a complex visual stimulus, despite differences in viewing conditions, expression, etc. The system operates on the principle that, since faces tend to be similar in overall configuration, it is possible, through known Karhunen-Loeve (KL) filtering (also know as principal component analysis or PCA filtering) to reduce a multi-dimensional vector making up a face-containing image into a relatively simple description in a low dimensional space. By determining the vectors that best account for the distribution of face images within the entire image scene, one is able to define a sub-space of face images, reducing the data set considerably, and thereby enabling one to focus on the limited set of data making up the facial characteristics. Once defined, comparison of the face data with known data, for triggering recognition, can be performed. This subject matter is disclosed in "Eigenfaces for Recognition," Turk et al., *Journal of Cognitive Neuroscience*, Vol. 3, No. 1, pp. 71–86, and Turk et al. U.S. Pat. No. 5,164,992 entitled "Face Recognition System".

The difficulty with such systems, however, is that they have not proven robust enough to account for the numerous different sizes and orientations of the object within the visual window. For example, within a given visual scene to be detected and analyzed, a face can occupy a large or relatively small portion of the scene. Further, the face can be turned somewhat, or oriented in any of numerous different directions.

Recent research into the operation of the human visual system has suggested that visual data is routed to two different regions of the brain. First, the posterior inferotemporal cortex (PIT) retains local topographical information of the observed object, in order to enable a detailed sense of the topography, orientation and position of the object. By contrast, in the anterior inferotemporal cortex (AIT) a so-called "visual icon" is formed, independently of the topography of the image, which correlates the data of the PIT with a value judgement as to what the perceived object is, as well as defining what is to be spotlighted and memorized. Conceived in this way, the AIT is seen as having a plurality of icon areas which are capable early on of recognizing a coarse object as being a face or a house, for example, triggering the brain to memorize such information for comparison with previously learned data relating to the same visual icon. It is thought that the definition of icons in the AIT are scale invariant, or in other words, that a given object, independent of its scale within the scene, will trigger the same visual icon in the AIT. The brain then correlates the topographical information stored in the PIT, which is scale dependent, with the icon-like representation in the AIT in order to enable a full recognition of the object.

Therefore, a need has arisen to somehow, out of a plurality of potentially variant image scenes, extract scale invariant information relating to the particular type of object of interest which shall define the visual icon in the AIT. In other words, in the AIT, a visual icon to be formed should be completely independent of the size or position of the stimulus within the visual field. For example, a subject's head which occupies 90 percent of the visual field, and which is turned slightly, should trigger the same visual icon in the AIT as a head which only occupies 20 percent of the visual field and which is facing directly forward. When information is sent and stored in the AIT, the brain must be capable of forming a window of attention on the object which is scale invariant.

A prior art attempt to solve the problem of scale invariance to enable pattern recognition has been disclosed in "A Neurobiological Model of Visual Attention and Invariant Pattern Recognition Based on Dynamic Routing of Information," Olshausen et al., *The Journal of Neuroscience*, November 1993 13(11), pp. 4700–4719. This prior art model, however, proposes a re-routing of visual images on their course through the ventral visual pathway, and requires a highly specific control of any item of the forward filtering pathway by a specific control neuron. When applied to artificial recognition of image information in the form of pixels, the prior art requires a specific sub-system for re-routing selected pixel areas of the original input pixel matrix so as to fit the image onto a matching screen. The scheme therefore requires a highly complex and specific wiring and contact pattern of control circuits in order to implement the model, and is only viable for simple small scale patterns.

SUMMARY OF THE INVENTION

The present invention is directed to a neural model, and a computer architecture therefor, for solving the problem of attention control for the formation of scale invariant icons, while at the same time avoiding the complexity of the routing circuitry disclosed by the prior art.

An object of the present invention is to provide an artificial visual system comprising:

video camera means for picking up a visual image;

means for converting the visual image into a matrix of pixels, the visual image containing at least one item therein to be recognized by the visual system, the item occupying a portion of the matrix of pixels;

KL filtering means for focusing attention on the item within the matrix of pixels thereby defining the item as a plurality of vectors defining a sub-space of the item within the image, each of the vectors being defined by a predetermined number of KL components;

means for supplying the pixel information of the item to a memory means, the means for supplying comprising constant resolution filtering means for limiting the number of KL components per vector in order to maintain the resolution of the item at a predetermined constant resolution;

means for comparing the pixel information supplied from the means for supplying with stored data in the memory means of a similar item in order to recognize the pixel information as corresponding to the item; and means for triggering formation of an icon representing the item when a result of the comparison indicates an agreement between the pixel information of the item and the stored data.

It is a further object of the invention to provide an artificial visual system, wherein the constant resolution filtering means limits the number of components according to the following equation (1), such that, $$RF=C \qquad (1)$$

wherein R is a radius of a window of attention circumscribing the item, F is a maximum frequency of the window of attention, and C is a constant.

It is a further object of the invention to provide an artificial visual system, wherein the constant resolution filtering means limits the number of components to a predetermined number M, based on the following equation (2), such that, $$R^2 \sum_{i=1}^{M} ActPCA(i,F) = C \qquad (2)$$

where R is a radius of a window of attention circumscribing the item, F is a maximum frequency of the window of attention, ActPCA(i,F) is an activity (vector value) of the i-th principal component of the frequency F, and C is a constant.

It is a further object of the invention to provide an artificial visual system, wherein the KL filtering means comprises a plurality of KL filters interconnected together, each KL filter defining the item as a plurality of vectors defined by a predetermined number of KL components.

It is a still further object of the present invention to provide an artificial visual system, wherein the plurality of KL filters comprises systems first through fourth KL filter.

It is a further object of the invention to provide an artificial visual system, wherein an output from at least one of the first through fourth KL filters is supplied as an input to the memory means.

It is a further object of the present invention to provide an artificial visual system, further comprising a low pass filter for low pass filtering the image processed by the KL filtering means.

It is a still further object of the present invention to provide a method for image recognition based on adaptive scaling including the steps of:

picking up a visual image;

converting the visual image into a matrix of pixels, the visual image containing at least one item therein to be recognized, the item occupying a portion of the matrix of pixels;

filtering the image through KL filtering to focus attention on the item within the matrix of pixels, thereby defining the item as a plurality of vectors defining a sub-space of the item within the image, each of the vectors being defined by a predetermined number of KL components;

supplying the pixel information of the item to a memory means while limiting the number of KL components per vector in order to maintain the resolution of the item at a predetermined constant resolution;

comparing the supplied pixel information with stored data of a similar item in order to recognize the pixel information as corresponding to the item; and triggering an icon representing the item when a result of the comparison indicates an agreement between the pixel information of the item and the stored data.

It is a further object of the invention to provide a method for image recognition, wherein the constant resolution is maintained according to the following equation (1):

$$RF=C \qquad (1)$$

where R is a radius of a window of attention circumscribing the item, F is a maximum frequency of the window of attention, and C is a constant.

It is a further object of the invention to provide a method for image recognition, wherein the constant resolution is maintained by limiting the number of components to a predetermined number M according to the following equation (2):

$$R^2 \sum_{i=1}^{M} ActPCA(i,F) = C \qquad (2)$$

where R is a radius of a window of attention circumscribing the item, F is a maximum frequency of the window of attention, ActPCA(i,F) is an activity of the i-th principal component of the frequency F, and C is a constant.

It is a further object of the invention to provide a method for image recognition, wherein the step of filtering includes filtering the image through a plurality of interconnected KL filters, each KL filter defining the item as a plurality of vectors each having a predetermined number of KL components.

It is a still further object of the invention to provide a method for image recognition, wherein the plurality of KL filters comprises first through fourth KL filters.

It is a still further object of the invention to provide a method for image recognition, wherein an output from at least one of the first through fourth KL filters is supplied as an input to the memory means.

It is a further object of the present invention to provide a method for image recognition, further comprising a step of low pass filtering the image processed by the KL filters.

According to the present invention, a memory address and/or processing element of a computer system is activated to trigger an icon corresponding to a selected portion of a visual image, the system being capable of focusing attention on a particular portion or item in an imaged scene (for example a face) and triggering formation of the icon independent of the scale of the item within the scene.

More specifically, the present invention operates by, after having centered attention on the item within an imaged scene, data in the form of pixel information regarding the item is supplied to a processing element, wherein the amount of supplied data is controlled such that, independent of the size or scale of the item within the imaged scene, the quantity of information regarding the item is the same for all like items.

In particular, the amount of data is controlled so that for all resolved images relating to the same item, data will be supplied to the processing element at a constant resolution, regardless of the size or scale of the item within the imaged scene.

BRIEF DESCRIPTION OF THE DRAWINGS

Following, with reference to the appended figures, the artificial visual system and method for image recognition according to the present invention shall be described in greater detail, wherein:

FIG. 5 is a graph showing the relationship between the number of KL components and the input power supplied to a KL filtering means, and further illustrating a threshold for limiting the input power.

FIG. 6 is a graph showing an activation function of the inhibitory control, according to the present invention, which will tolerate n active inputs, but rapidly increases inhibition with the number of inputs greater than n, thereby adjusting the total number of inputs in the neighborhood of n.

FIG. 7 is a graph showing the required number of KL components per local vector to ensure constant resolution.

DETAILED DESCRIPTION OF THE PREFERRED EMBODIMENTS

In order to better describe the processing elements of the computer architecture according to the present invention, it is first helpful to understand the major processing centers of visual information known to exist in the human brain.

Figure 1:
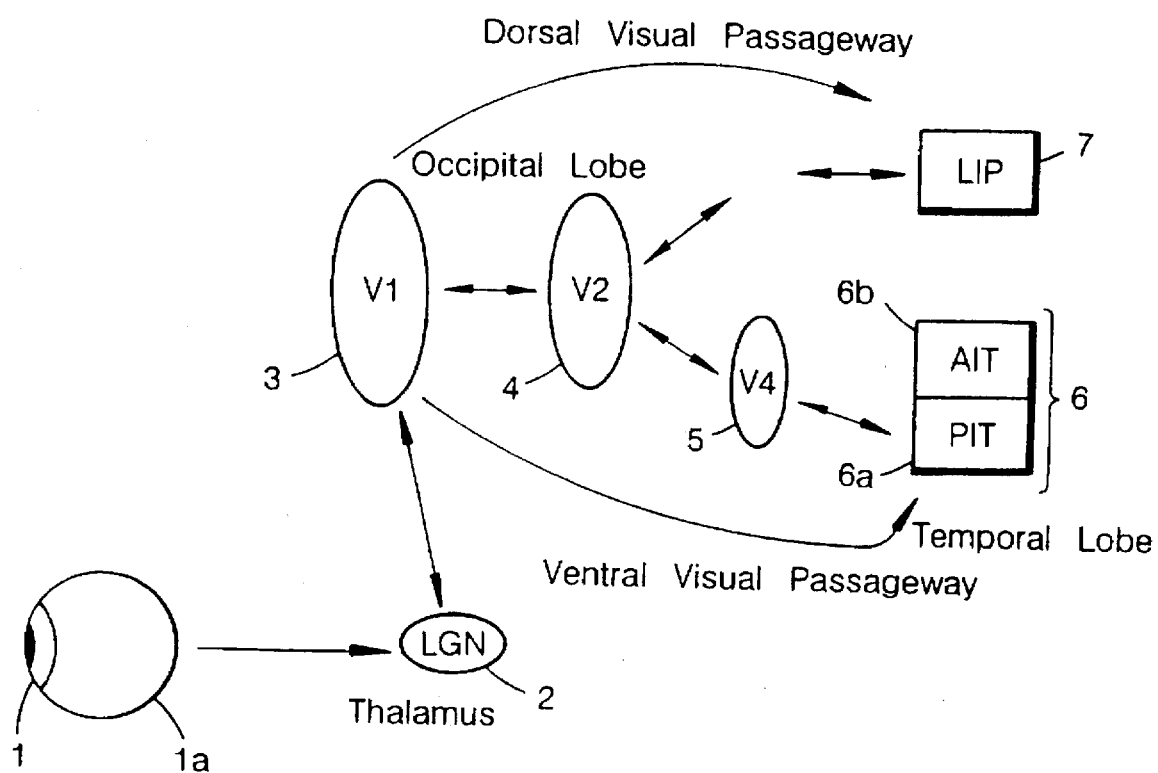
FIG. 1 is a description of the major visual processing centers of the human brain.

As shown in FIG. 1, a visual input is received through the eye 1 and the retinal image 1a created thereby is supplied to the lateral geniculate body (LGN) area 2 of the thalamus, the thalamus serving an input center of the visual data. From the thalamus, visual information is supplied to the V1 area 3 in which various information concerning color, motion, textures and topographical information is processed. From the V1 area 3, topographic information defined by local lines which are correlated together into more complex shapes is processed and refined in a stepwise manner through V2 and V3 areas (only the V2 area 4 being shown for simplicity), ultimately yielding topographic information of the object at the V4 layer 5. From the V4 layer 5, the visual information is supplied to the inferotemporal cortex, or IT 6. It is hypothesized by the present inventors, that in the IT, the visual data is bifurcated into respective areas of the IT, the PIT 6a and the AIT 6b. First, a topographic representation of the visual object is stored in the PIT 6a, whereas a non-topographic global representation, in the form of a visual icon, is stored in the AIT 6b. As mentioned above, the AIT 6b is believed to play a fundamental role in the recognition of objects, and comparison thereof with known or learned data, and also in determining what is to be memorized.

A separate pathway of visual information is known to flow from the V1 area 3 to the lateral inferotemporal parietal cortex (LIP) 7; this passage, referred to as the dorsal visual passageway, is believed to be related to low resolution, peripheral information concerning space relation and egocentric images.

By contrast, the visual passageway through V1–V4 to the inferotemporal cortex (IT) is related to high resolution object recognition, involving interaction between the anterior inferotemporal cortex (AIT) 6a and the posterior inferotemporal cortex (PIT) 6b to retain both topographic information of the object, while also providing an icon-like representation thereof in the AIT 6b to enable recognition of the object. This passageway, referred to as the ventral visual passageway in FIG. 1, forms the framework on which the present computer visual system is based.

Figure 2:
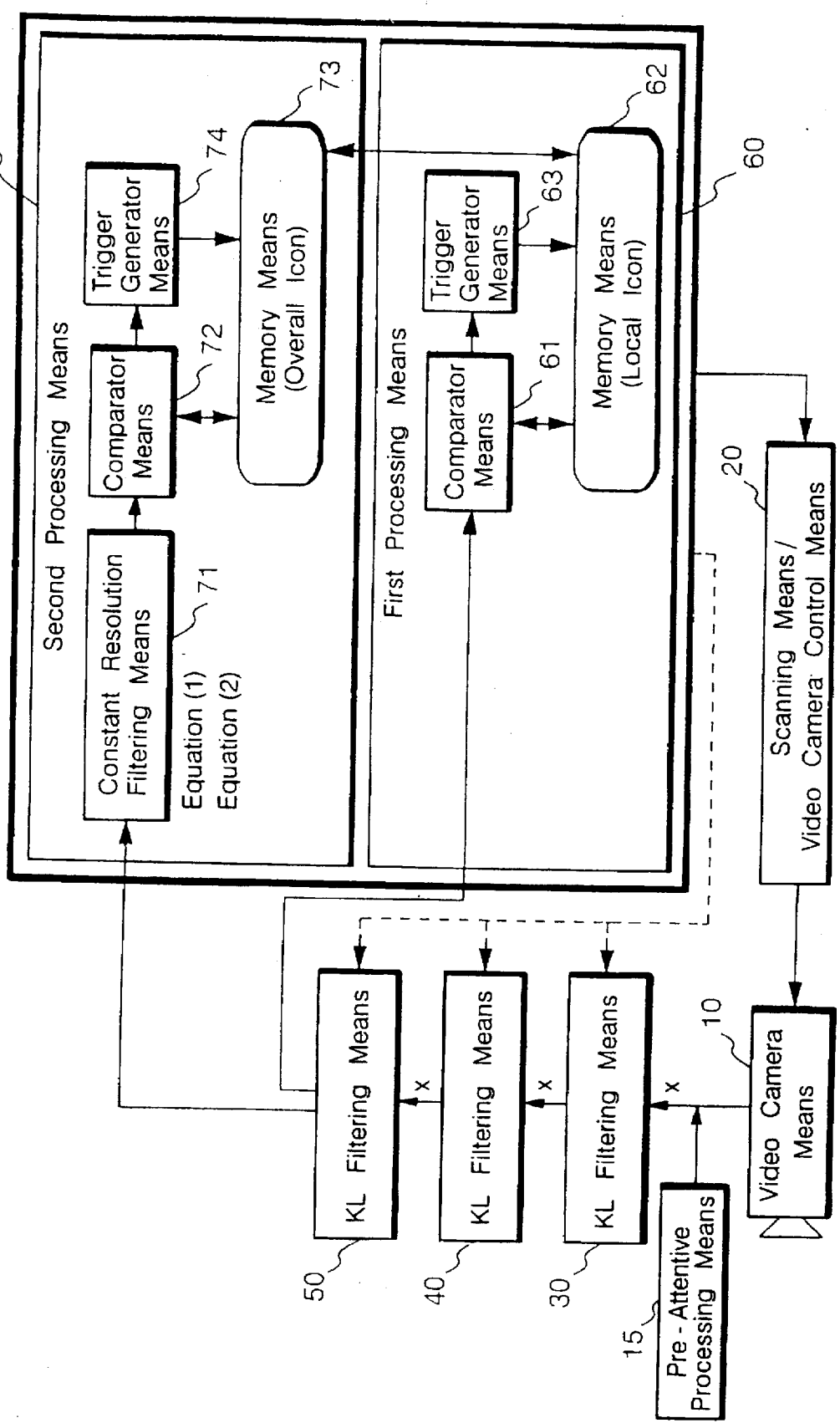
FIG. 2 is a general description of the system architecture according to the present invention, including processing areas corresponding to selected portions of the description shown in FIG. 1.

Referring now to FIG. 2, the system architecture of the present invention shall be described in detail.

First, a visual image containing an object to be recognized is picked up by a suitable camera means, such as a video camera. Scanning means 20 are provided which, analogous to the operation of the human eye, can cause the camera to focus on, or spotlight, a particular portion of the image. From the camera, the video image is converted, by a suitable conversion means, into image data defined by a plurality of pixels of varying intensities. Such image data is supplied to the first KL filtering means 30 through a predetermined number of input sites (schematically illustrated by x). Prior to supplying the signal to the KL filtering means 30, the image may be processed by a pre-attentive processing means 15, which may comprise a low pass filter and/or color filter for example, in order to selectively yet coarsely define areas of interest as "blobs" of activity out of the overall image scene. The areas of interest relating to such pre-defined "blobs" are then subjected to KL filtering in the KL filtering means 30, as described below.

In a manner somewhat analogous in function to the V1 area 3 of the brain, the image data is processed by the KL filtering means 30 to determine a topographically ordered set of local KL-vectors from the image data whereby the receptive fields of the local KL filters may or may not overlap. This topographically ordered set of local KL vectors serves as the input to the next level filtering means, or directly to the AIT sub-system, to define a sub-space of images related to the particular object desired to be recognized. As shall be discussed in further detail later, each of the local KL vectors is defined by a predetermined number of KL components.

Subsequent second through fourth KL filtering means 40, 50 are provided downstream from the first KL filtering means. The second through fourth KL filtering means 40, 50 correspond essentially to the V2–V4 areas of the brain (only the second and fourth KL filtering means 40, 50 being illustrated for simplicity), and each of the downstream KL filtering means 40, 50 also has a predetermined maximum number of input sites x. Again, in a manner similar to the first KL filtering means 30, each of the subsequent filtering means further refines the image data, via known KL filtering principles, to correlate local lines into more complex shapes, each of the subsequent KL filtering means thereby further defining the sub-space out of the image relating to the object desired to be recognized. Again, each vector determined by the above-described KL filtering means 30, 40 and 50 is defined by a predetermined number of KL components, as shall be discussed in further detail hereinbelow.

From the fourth KL filtering means 50, two respective signals are output so as to be received by respective first and second processing means 60 and 70.

The first processing means stores information relating to the position and topography of the object under consideration within the image scene. The signal received by the first processing means 60 is first compared by a comparator means 61 with a memorized pattern stored beforehand in a memory means 62. When the result of such a comparison indicates agreement or correspondence, a visual icon (local icon) corresponding to the aforementioned image position and topographical information, and based on the stored pattern, is triggered by a trigger generator means 63. Further, the triggered local icon, along with the memorized pattern which has been stored beforehand, are then stored together in the memory means 62.

The second processing means 70 stores visual icons of the image data, essentially defining what the image is. As for the signal received by the second processing means, the number of KL components is limited by a constant resolution filtering means 71. More specifically, in the fixed resolution filtering means 71, limiting of the number of KL components is performed by the following equations (1) and (2):

$$RF = C \quad (1)$$

(Where R is a radius of a window of attention circumscribing the item, F is a maximum frequency of the window of attention, and C is a constant.)

$$R^2 \sum_{i=1}^{M} ActPCA(i,F) = C \quad (2)$$

(Where R is a radius of a window of attention circumscribing the item, F is a maximum frequency of the window of attention, ActPCA(i,F) is an activity (vector value) of the i-th principal component of the frequency F, and C is a constant.)

Subsequently, the KL components which have been limited as described above are compared by a comparator means 72 with a memorized pattern stored beforehand in a memory means 73. When the result of such a comparison indicates agreement or correspondence, a visual icon (overall icon) corresponding to the aforementioned image, and based on the stored pattern, is triggered by a trigger generator means 74. Further, the thus-triggered overall icon, along with the memorized pattern which has been stored beforehand, are then stored together in the memory means 73.

The memory means 73 consists of an array of processors. Each of the processors (at a specific storage area or address of the memory means 73) represents a specific visual icon. Different storage areas or address of the memory means 73 trigger icons in response to recognition of specific images, such as a face, a human face, a human face having particular characteristics, etc., enabling a comparison of the visual data with known images.

At the same time, each respective overall icon triggered by the trigger generator means 74 is correlated or paired with the topographical information relating to the icon (local icon) which has been stored in the memory means 62 of the first processing means 60. It should be noted that the function of the first processing means 60 is analogous to the PIT area 6a of the brain, discussed hereinabove, whereas the function of the second processing means 70 is analogous with the AIT area 6b.

By pairing the visual icon triggered in the second processing means 70 with the position/topography information stored in the first processing means 60, such a correlation may serve as a feedback means along signal line f for refining the scanning of the video camera 10 to focus more clearly on a recognized image, enabling a more precise recognition when required. For example, assuming processing through the first through fourth KL filters triggers an icon in the second processing means 70 indicating a house, for example, the feedback control can enable more focused scanning of the area within the image relating to the topographical and positional information contained in the first processing means 60. Subsequent KL filtering could then verify and trigger one or more further icons indicating that the house was a European house, for example.

It should further be understood that, since the first through fourth KL filters operate in the same manner, further refining of the image data according to known KL filtering principles, and stepwise processing of the image by each of the first through fourth KL filtering means 30, 40, 50 is not essential in all cases. When sufficient resolution can be achieved in a fewer number of steps, the image information can be supplied directly to the fourth KL filtering means 50, and following a one-step filtering thereby, the topographical and icon data therefrom is supplied to the respective first and second processing means 60, 70. Alternatively, short cut routes directly from any of the first through third KL filtering means 30, 40 may be supplied to either or both of the first and second processing means 60, 70 once sufficient resolution of the item of interest is achieved.

As discussed above, a primary feature of the present invention is its ability to supply scale invariant image information to the AIT area 6b, or second processing means 70, of the system, thereby enabling the visual icon to be triggered independently of the scale, size, position and/or orientation of the item desired to be perceived. The manner in which such a scale invariant icon can be triggered will now be described in greater detail with reference to FIGS. 3 and 4.

Figure 3:
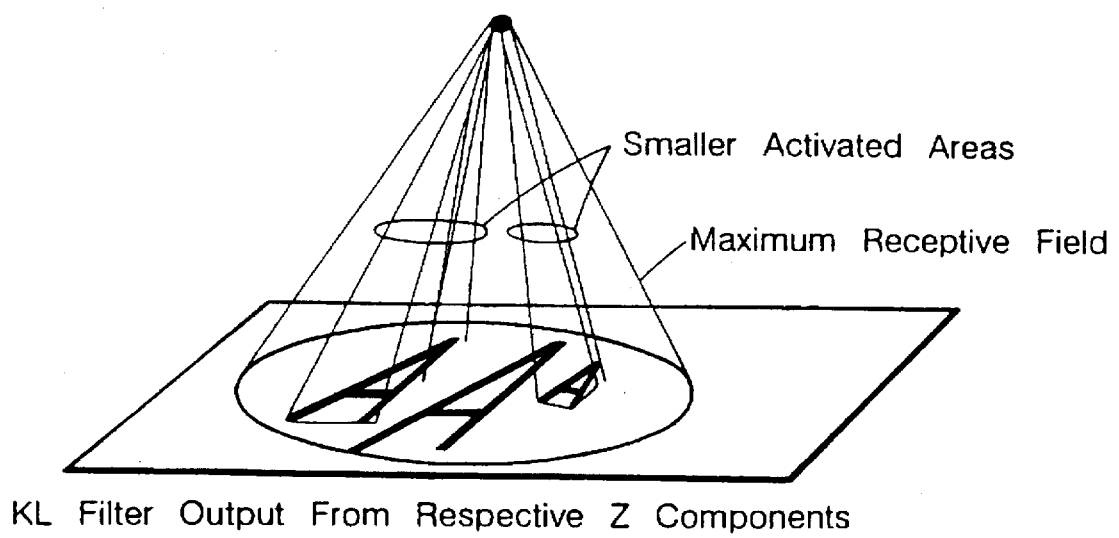
FIG. 3 is a diagram explaining the formation of a scale invariant icon in the AIT by controlling the resolution of the spot of attention to a fixed value independent of the size of the spot of attention.

Referring more specifically to FIG. 3, there is illustrated an image having items (represented by the letter A) which are to be recognized, and hence trigger the same visual icon within the second processing means 70 of the present invention. As shown, the image contains a large letter A which occupies a maximum receptive field of the image, and further smaller letters A which occupy smaller activated (or spotlighted) areas of the image. In order to achieve scale invariance at the AIT area 6b, it is essential for the same visual icon within the second processing means 70 to be triggered independently of the differing sizes of the activated areas corresponding to the images A. By way of example, assuming the letters A were to represent the same face to be recognized, the system should be robust enough to accurately recognize the faces as being the same (and hence trigger the same icon), regardless of the different sizes or orientations of the faces within the maximum receptive field. In other words, the size of the item within the visual field must always be re-sized, or scaled, to fit the memory pattern of the item stored in the second processing means 70, in order to enable a proper comparison therewith for triggering of the visual icon.

In order to achieve such scale invariance, according to the present invention, information is supplied to the second processing means 70 so as to have a constant resolution regardless of the size or detail of the spotlighted item within the maximum receptive field. More specifically, referring to the large letter A, the large letter A will occupy a comparatively large number of pixels within the maximum field, whereas the number of pixels corresponding to the smaller letters A will be fewer in number. Furthermore, the placement of the pixels relative to the item will be different for each differently sized item, thereby making it virtually impossible to compare each image with the same memory pattern of the image.

In order to achieve constant resolution for different sized items, the present invention employs KL filtering in such a manner that the number of inputs (KL components per local filter output) which are enabled to enter the AIT sub-system is adaptively controlled. This procedure is better described with reference to FIG. 4.

Figure 4:
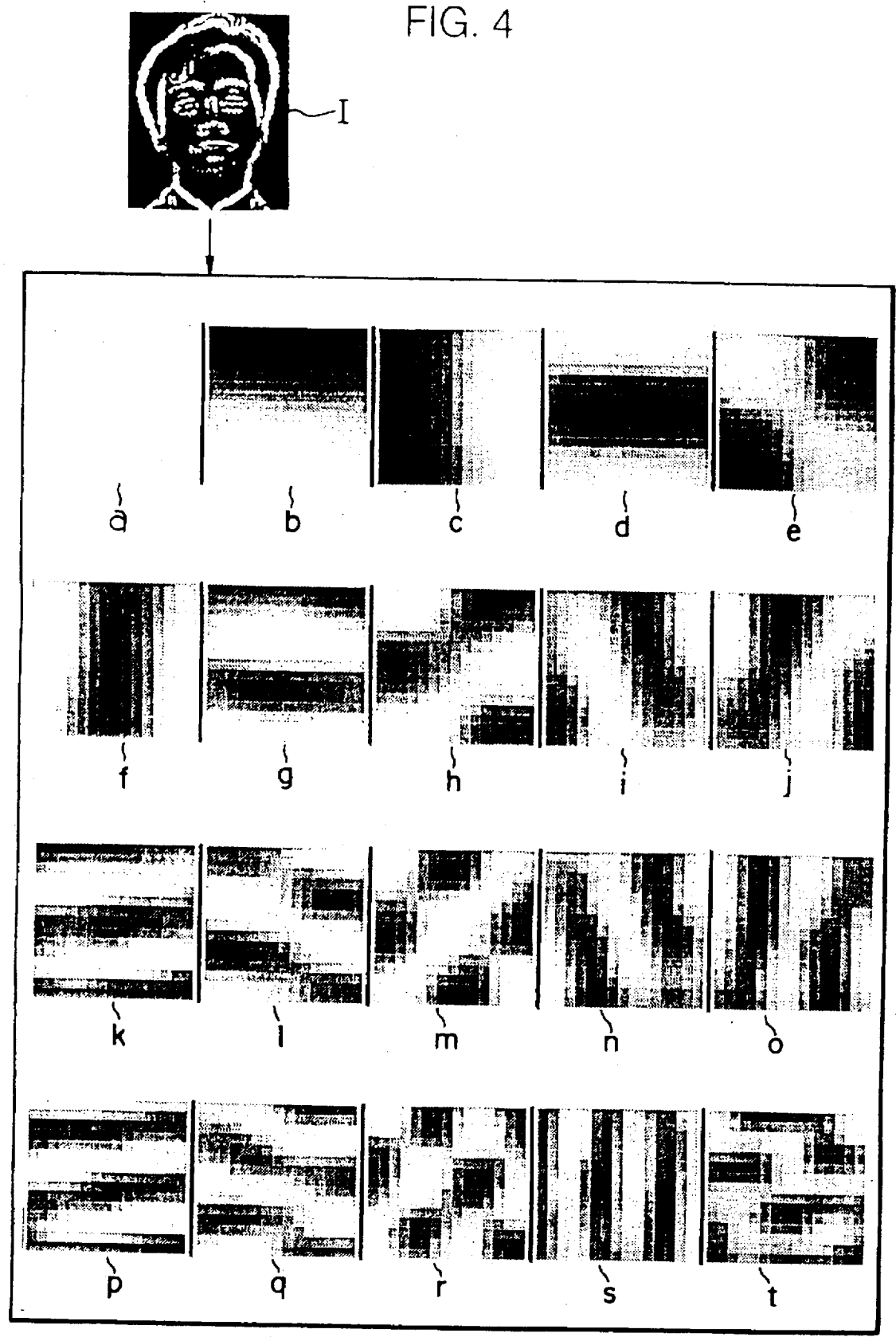
FIG. 4 is a photographic depiction showing a plurality of KL components defining textures of an input image.

FIG. 4 illustrates the processing of an image I, based on the texture of the image, via KL filtering, each of the blocks a, b, c, . . . , t indicating in schematic form different order KL components based on texture of the image I. As shown, with increasing order of the KL components, the complexity of the coded statistical correlation between the pixels within the receptive field of the KL filter increases. More specifically, FIG. 4 shows an input image I of a face and the first 20 components a, b, c, . . . , t of the local KL filters applied onto the image I, although it will be appreciated by those skilled in the art that the actual number of KL components may greatly exceed the number 20. Increasing the order of the components means increasing the complexity of such coded correlations. The present invention operates by inhibiting or limiting the number of inputs from the last preceding KL filters to the AIT sub-system depending on the scale of the image in the maximum receptive field.

Since the number of inputs to the AIT sub-system is adaptively controlled, the resolution of the filtering of the different scales of the object within the maximum receptive field is the same. With a large scale object, only the first few KL components per channel will get access to the filter, so that the filter is coarse over the large area. With a small scale object, the limited global number of inputs enables many more KL components per channel to enter the filter, with the result that a high resolution filtering occurs over the small area. Such a control serves for trading scale against depth of filtering.

In the present invention, the width in degrees of the maximum receptive field is a fixed value determined, for example, by the video system used. As shown in FIG. 2, each processor of the second processing means 70, corresponding to the AIT, has a maximum of x input channels, related to the maximum receptive field size. More specifically, each processor of the second processing means 70 is limited to having s (s≦x) active input channels, wherein s is determined by the size of the activated spot in the receptive field. If for a given image, more inputs than desired are rendered active, the system will purge the weakest of the inputs so as to input n(s) inputs, wherein n(s) is a function of s, and the inequality $(d/ds)(n(s)/s)<0$ holds for all s ($\forall$s). More specifically, by restricting the number of inputs to the second processing means 70 to a predetermined number n(s), as described above, the following result is obtained for one processor of the second processing means 70 having x input channels in its maximum receptive field size and wherein each channel defines a vector of z KL components. In the case where the activated image encompasses the maximum respective field, the filter will receive from any input channel n(x)/x KL components on average. As described above, as a natural consequence of KL filtering, the activation is highest for the first, coarse KL components, and rapidly decays with higher order components of greater complexity. Thus, for an image occupying a large space in the maximum receptive field, this is like filtering the receptive field only by the coarse first n(x)/x KL component vectors.

On the other hand, if only a smaller spot of the receptive field is activated (i.e. the other parts are not activated or blocked by inhibition), then the smaller number of active channels s (s<<x) will result in a larger number of components per channel n(s)/s (wherein n(s)/s>>n(x)/x, according to the above inequality) being accepted by the second processing means 70. The smaller area is therefore modeled with a larger number of components per channel, including higher components with their resulting higher resolution.

More specifically, referring now to FIGS. 5 and 6, such a feedforward inhibition for a certain icon sets an absolute value of inhibition that has to be overcome by any component input. FIG. 5 shows the power distribution over one KL vector, along with the inhibitory threshold t that is defined by the feedforward inhibition to limit the number of inputs. As shown, the inhibition first cancels the inputs of all higher KL components (KL components whose input activity values are below a control threshold t) of the KL vectors from all locations. As shown in FIG. 6, the activation function of the inhibitory control will tolerate n(s) active inputs, but rapidly increases inhibition with the number of inputs greater then n(s), thereby adjusting the total number of inputs in the neighborhood of n(s).

Using the scheme as described above, the second processing means 70, corresponding to the AIT, is capable of recognizing any icon processed by the fourth KL filtering means 50 corresponding to the V4 area, without requiring detailed fixation and scaling of the input image. The scheme automatically serves for adaptively scaling and routing of input information without any external controls (i.e. without specialized fixation or scaling within the total receptive field). Rather, the adaptive scaling is simply driven by the information flow itself. If we analogize the scheme to the flow of information through a pipe, the flow of information automatically forms the pipe having a constant amount of information across the cross-section of the pipe. A small pipe has a high resolution per unit area, and with increasing diameter of the pipe, the resolution per unit area decreases, such that the overall resolution of the cross-section remains constant. Such a pipe searches it way to the top filtering level while increasing or decreasing its diameter depending on the input configuration at each filter stage.

DETAILED EXAMPLE

The technique described hereinabove was implemented using a portion of the processing elements shown in FIG. 2, wherein an input image was supplied directly to the fourth KL filtering means 50, and the information resolved thereby was supplied to the second processing means 70 (corresponding to the AIT) in order to verify whether a visual icon in the AIT would be triggered independently of different scales of the image. On the image, an array of KL-filters having highly overlapping receptive fields of about 2.5 degrees (15×15 pixel) size defined local vectors of principal components of the image. Then, as shown in FIG. 7, the required number of KL components per local vector to ensure constant resolution from an attentional window size of about 5 to 30 degrees of pixel input was determined experimentally by reconstruction of the original image with different numbers of components per local vector and subsequently comparing the Fourier powerspectrum of the reconstructed images from different sized attentional windows.

We can relate the condition of constant resolution and the activity of principal components by using the Fourier transform, wherein

| | |
|---|---|
| R: | radius of the attentional window; |
| F: | required max. frequency of the attentional window; |
| ActPCA(i,F): | activity of the i-th principal component for frequency F; |
| PowFT(i,F): | Fourier powerspectrum of i-th principal component for frequency F; and |
| M: | required number of components. |

Thus, if we assume $$ActPCA(i,F) \alpha PowFT(i,F)$$

then equation (3) becomes, $$RF = \text{const.} \Rightarrow R^2 \sum_{i=1}^{M} ActPCA(i,F) = \text{const.} \qquad (3)$$

The required number of KL components for any respective maximum frequency was defined experimentally, as shown by the dashed line in FIG. 7. M was defined for each required frequency according to that result, and equation (3) shows the desired constancy property. Hence, under that condition the feedforward inhibition which keeps the value $R^2 \Sigma_{i=1-M} ActPCA(i,F)$ constant limits the number of KL components per local filter depending on the size of the attentional window (the active spot processed in the fourth KL filtering means 50) in such a way as to maintain constant resolution, as shown by the solid line in FIG. 7.

In order to implement the above technique, the input image was filtered through a low-pass filter 15 to define various suspicious "blobs" of activity in the fourth KL filtering means 50; each blob having a different size. The blobs were sequentially scanned according to their respective overall sum of activation, and the size of the blob defined the window of attention. With the described adaptive scaling mechanism, any size of the active spot (region) in the fourth filtering sub-system was capable of triggering recall of its respective scale-invariant icon.

As described hereinabove, the adaptive scaling mechanism is a simple and biologically plausible method to activate visual icons in a processing means corresponding to the AIT independent of the scale of the item of interest in the overall image. Hence, the method and apparatus serves for matching objects described topographically in a processing means corresponding to the PIT area, having any scale, onto only one scale-invariant icon.

A specific and further feature of the image recognition system is that the definition of an attention window by "blob" selection, based on low-pass filtering, can be sharpened or modified in another way by a feedback from the AIT memory representation of the respective recalled visual icon onto the KL filtering means 30, 40, 50 corresponding to V1 through V4 filtering sub-systems. (Such a feedback is illustrated by the dotted line shown in FIG. 2.) Such an adjustment of the attention window from a coarsely selected "blob" to an even more definitely selected area according to the recall of the visual icon can be employed as an iterative process.

Furthermore, because of the topographic local filtering from the KL-filtering V1 to V4 sub-systems 30, 40 and 50, such an iterative adjustment of the required attentional window by feedback along signal line f from the AIT processor 70 can also be implemented in parallel with feedback signals from any or all of the implemented KL-filtering means 30, 40, 50 corresponding respectively to V1 through V4 sub-systems, and in addition may include a physical zooming or variation of a lens of the video camera 10 to thereby optimally adjust the matching of the KL-filtered visual input at V4 with the memory recall of the respective visual icon in the AIT processing sub-system.

As clearly set forth above, in the artificial visual system according to the present invention, even if the scale of an item contained in a visual image picked up via a video camera differs, because the resolution of the item is maintained at a fixed resolution, the same icon can be triggered independent of the scale of the item.

Further, in the image recognition method of the present invention, even though the scale of an item in the picked up visual image differs, because the item is adaptively scaled by maintaining the resolution of the image at a fixed resolution, the same scale invariant icon is triggered, enabling recognition of the same image independent of its scale.

There has been described herein an artificial visual system, and method for adaptive scaling, for image recognition. However, it will be readily appreciated that various adaptations and modifications could be made to the preferred embodiments without departing from the basic principles of the present invention. We claim as our invention not only the illustrated embodiments but all such modifications, variations and equivalents which would be readily understood by those skilled in the art as coming within the scope of the appended claims.

What is claimed is:

1. An artificial visual system comprising:

video camera means for picking up a visual image;

conversion means for converting said visual image into a matrix of pixels, said visual image containing at least one item therein to be recognized by said visual system, said item occupying a portion of said matrix of pixels;

KL (Karhunen-Loeve) filtering means for focusing attention on said item within said matrix of pixels thereby defining said item as a plurality of vectors defining a sub-space of said item within said image, each of said vectors being defined by a predetermined number of KL components;

means for supplying pixel information of said item to a memory means, said means for supplying comprising constant resolution filtering means for limiting the number of KL components per vector in order to maintain a resolution of said item at a predetermined constant resolution;

comparator means for comparing said pixel information supplied from said means for supplying with stored data in said memory means of a similar item in order to recognize said pixel information as corresponding to said item; and means for triggering formation of an icon representing said item when a result of the comparison indicates an agreement between said pixel information of said item and said stored data.

2. An artificial visual system according to claim 1 wherein said constant resolution filtering means limits the number of KL components according to the following equation (1) such that, $$RF = C \qquad (1)$$

wherein R is a radius of a window of attention circumscribing said item, F is a maximum frequency of said window of attention, and C is a constant.

3. An artificial visual system according to claim 1 or claim 2, wherein said constant resolution filtering means limits the number of KL components to a predetermined number M depending on the input, based on the following equation (2), such that, $$R^2 \sum_{i=1}^{M} ActPCA(i,F) = C \qquad (2)$$

wherein R is a radius of a window of attention circumscribing said item, F is a maximum frequency of said window of attention, ActPCA(i,F) is an activity (vector value) of an i-th principal component of said frequency F, and C is a constant.

4. An artificial visual system according to claim 1, wherein said KL filtering means comprises a plurality of KL filter systems interconnected together, each KL filter system defining said item as a plurality of vectors defined by a predetermined number of KL components.

5. An artificial visual system according to claim 4, wherein said plurality of KL filter systems comprises first through fourth KL filter systems.

6. An artificial visual system according to claim 5, wherein an output from at least one of said first through fourth KL filter systems is supplied as an input to said memory means.

7. An artificial visual system according to claim 1, further comprising a low pass filter for low pass filtering said image processed by said KL filtering means.

8. An artificial visual system according to claim 1, wherein a pre-attentive processing means defines said visual image containing at least one item therein to be recognized by said visual system.

9. An artificial visual system according to claim 8, wherein said pre-attentive processing means determines a window of attention within said visual image by low pass filtering and/or color filtering.

10. An artificial visual system according to claim 9, further comprising means for supplying a feedback signal from said memory means, following triggering of said icon in said memory means, to said KL filtering means, to enable more refined filtering of said window of attention identified by said pre-attentive processing means.

11. An artificial visual system according to claim 9, further comprising means for supplying a feedback signal from said memory means, following triggering of said icon in said memory means, to a control means for controlling said video camera to thereby cause said video camera to zoom or selectively scan an area within said image identified by the triggered icon so as to optimize a matching of the triggered icon with respective outputs from said KL filtering means.

12. A method for image recognition based on adaptive scaling including the steps of:
    picking up a visual image;
    converting said visual image into a matrix of pixels, said visual image containing at least one item therein to be recognized, said item occupying a portion of said matrix of pixels;
    filtering said image through KL (Karhunen-Loeve) filtering to focus attention on said item within said matrix of pixels, thereby defining said item as a plurality of vectors defining a sub-space of said item within said image, each of said vectors being defined by a predetermined number of KL components;
    supplying pixel information of said item to a memory means while limiting the number of KL components per vector in order to maintain a resolution of said item at a predetermined constant resolution;
    comparing the supplied pixel information with stored data of a similar item in order to recognize said pixel information as corresponding to said item; and
    triggering an icon representing said item when a result of the comparison indicates an agreement between said pixel information of said item and said stored data.

13. A method for image recognition according to claim 12, wherein the constant resolution is maintained according to the following equation (1):

$$RF = C \qquad (1)$$

where R is a radius of a window of attention circumscribing said item, F is a maximum frequency of said window of attention, and C is a constant.

14. A method for image recognition according to claim 12 or 13, wherein the constant resolution is maintained by limiting the number of KL components to a predetermined number M depending on the input according to the following equation (2):

$$R^2 \sum_{i=1}^{M} ActPCA(i,F) = C \qquad (2)$$

where R is a radius of a window of attention circumscribing said item, F is a maximum frequency of said window of attention, ActPCA(i,F) is an activity (vector value) of an i-th principal component of the frequency F, and C is a constant.

15. A method for image recognition according to claim 12, wherein said step of filtering includes filtering said image through a plurality of interconnected KL filters, each KL filter defining said item as a plurality of vectors each having a predetermined number of KL components.

16. A method for image recognition according to claim 15, wherein said plurality of KL filters comprises first through fourth KL filter systems.

17. A method for image recognition according to claim 12, wherein an output from at least one of said first through fourth KL filter systems is supplied as an input to said memory means.

18. A method for image recognition according to claim 12, further comprising a step of low pass and/or color filtering said image processed in said KL filtering step so as to pre-attentively select a window of attention within said visual image.

19. A method for image recognition according to claim 18, further comprising a step of supplying a feedback signal from said memory means, following triggering of said icon in said memory means, to said KL filtering step, to enable more refined KL filtering of said window of attention.

20. A method for image recognition according to claim 18, further comprising a step of supplying a feedback signal from said memory means, following triggering of said icon in said memory means, to a control means for controlling a video camera that is picking up said visual image to thereby cause said video camera to zoom or selectively scan an area within said image identified by the triggered icon so as to optimize a matching of the triggered icon with respective outputs from said KL filtering step.

* * * * *